G. H. BOYD.
INCUBATOR.
APPLICATION FILED OCT. 16, 1906. RENEWED JAN. 25, 1909.
932,108.
Patented Aug. 24, 1909.
2 SHEETS—SHEET 1.
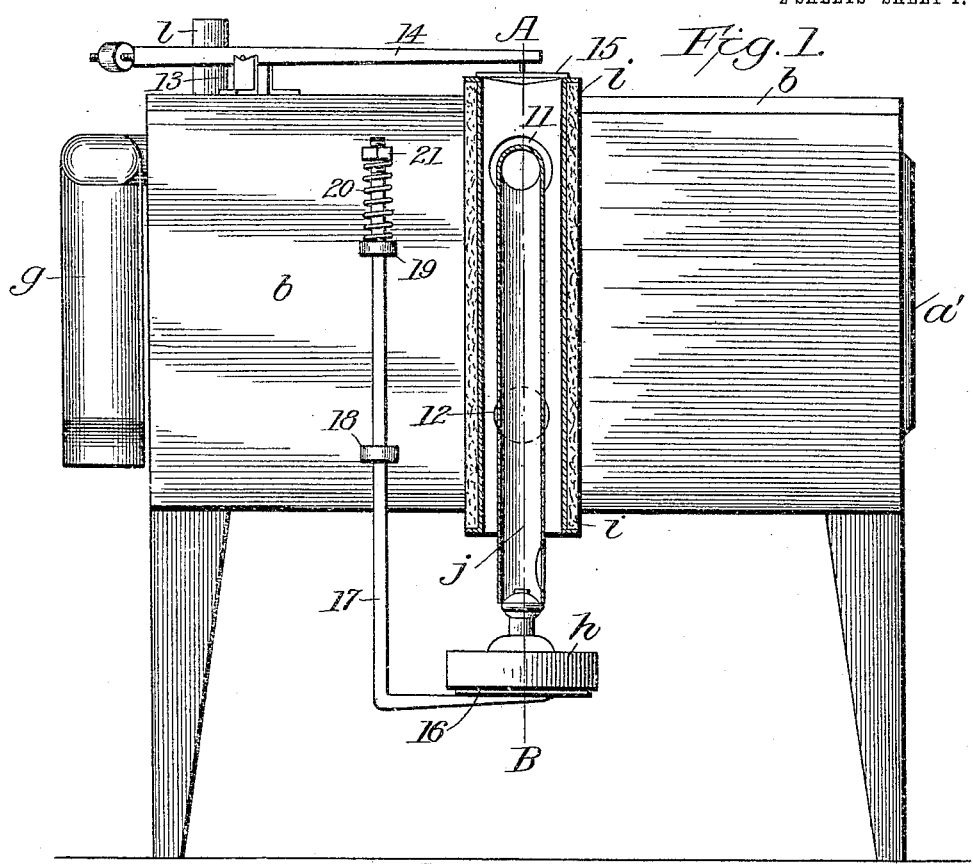
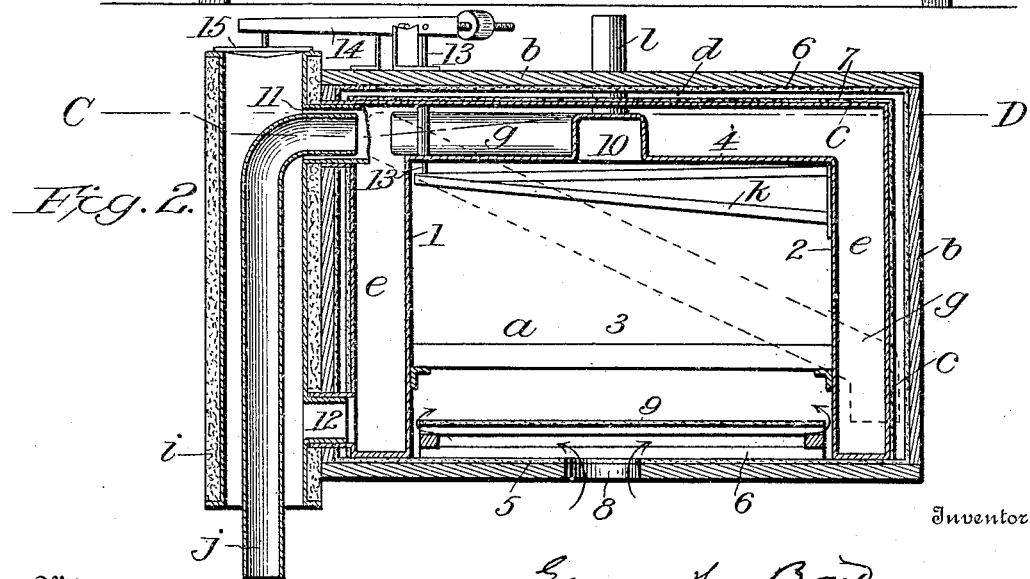

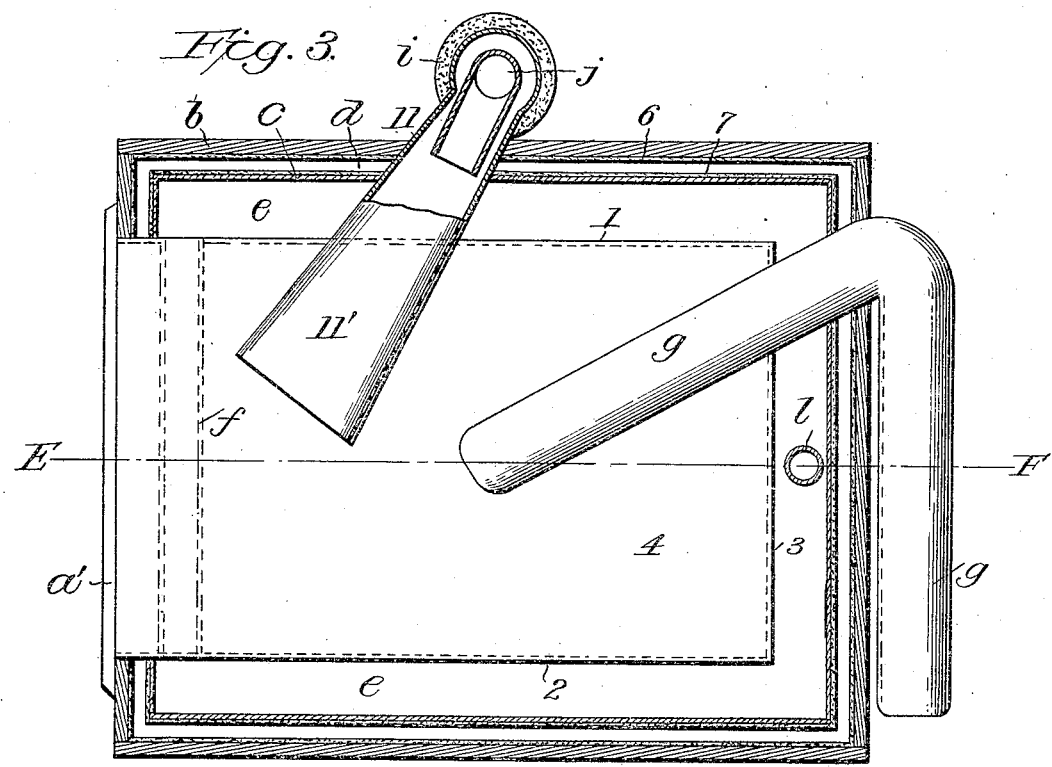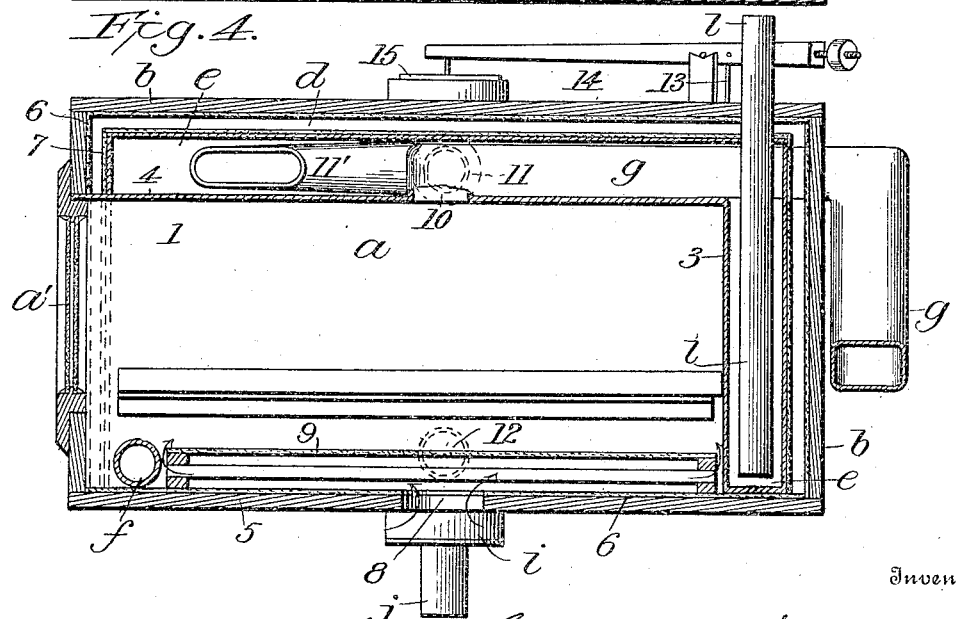

UNITED STATES PATENT OFFICE.

GEORGE H. BOYD, OF WASHINGTON, DISTRICT OF COLUMBIA.

INCUBATOR.

932,108.  Specification of Letters Patent.  Patented Aug. 24, 1909.

Application filed October 16, 1906, Serial No. 339,176. Renewed January 25, 1909. Serial No. 474,154.

*To all whom it may concern:*

Be it known that I, GEORGE H. BOYD, a citizen of the United States of America, and a resident of Washington, in the District of Columbia, have invented a new and useful Improvement in Incubators, of which the following is a specification.

This invention relates, primarily, to lamp-heated incubators, and it consists in certain novel combinations of parts hereinafter described and claimed.

The leading object of the present invention is to render practicable the admission of external air into the egg chamber at bottom in a very direct way so as to fully utilize its natural moisture and ozone, and at the same time to prevent such air being drawn into the egg chamber so rapidly as to chill the eggs.

Another object is to provide for freely discharging the foul air charged with carbon-dioxid from the egg chamber through the top of the latter so as to more perfectly ventilate the egg chamber.

Another object is to shorten the outlet pipe through which the foul air is discharged in the manner set forth in my previous specification forming part of Letters Patent No. 828,181, dated August 7, 1906, and at the same time to keep the pipe free from dampers and like obstructions.

Another object is to provide, in so discharging the foul air, for the free flow of the air in larger quantity and consequently at less velocity from an egg chamber of given cubical capacity.

Other objects are to more uniformly and effectively heat the egg chamber from outside its metallic walls, and to utilize for this purpose the hot products of combustion as well as the air heated by the lamp.

Two sheets of drawings accompany this specification as part thereof.

Figure 1 is a side view of the improved incubator with the flues in the foreground in vertical section; Fig. 2 represents a cross section on the line A—B, Fig. 1, omitting some of the parts; Fig. 3 represents a horizontal section on the line C—D, Fig. 2; and Fig. 4 represents a vertical section on the line E—F, Fig. 3, a flue in the plane of section being shown in elevation.

Like reference characters refer to like parts in all the figures.

In the improved incubator a rectangular or substantially rectangular egg chamber, $a$, is provided with the customary double-glass door, $a'$, at one of its vertical sides or ends hereinafter termed its front end; its other vertical sides, 1, 2 and 3, and its top, 4, are of suitable heat-conducting sheet metal; and its floor, 5, is preferably and conveniently of wood forming part of the outer casing, $b$, of the incubator. The vertical walls and top of the casing $b$ are preferably and conveniently of wood, and the whole is lined with asbestos cloth, 6, or the like, which forms a carpet within the egg chamber $a$. An inner lining, $c$, of sheet metal covered with asbestos cloth, 7, or the like, forms a non-conducting air space, $d$, beneath the top of the outer casing $b$ and within its vertical sides and ends. Between this inner lining $c$ and the metallic top and side walls of the egg chamber $a$ a hot-air chamber, $e$, is formed, and a hot-air tube, $f$, Figs. 3 and 4, connect the side portions of this hot-air chamber with each other immediately inside the door, $a'$; said tube extending horizontally through the egg chamber $a$ at the bottom, and serving to promote the circulation of the hot-air and to prevent the chilling of the eggs near the door.

Outside air is freely admitted to the egg chamber $a$ at bottom through a central opening, 8, shown in the plane of section in Figs. 2 and 4; a baffle plate, 9, of asbestos board or the like being supported above the floor of the egg chamber adjacent to this opening, so as to prevent a direct draft therethrough; the fresh air being thus compelled to enter the egg chamber near its warm side walls and in contact with the hot-air tube $f$ at the front of the egg chamber, as indicated by arrows in Figs. 2 and 4.

The foul air is discharged from the top of the egg chamber $a$, through a central opening, 10, in its metallic top, into and through an outlet pipe, $g$, which is flattened as shown so that a pipe of relatively large area in cross section may be introduced between the egg chamber $a$ and the top of the incubator without contracting the egg chamber or enlarging the casing. The object of employing an amply large pipe is to give it sufficient capacity for the free escape therethrough of the foul air at a low velocity, in order that there may be no appreciable draft within the egg chamber. Said outlet pipe $g$ extends in a horizontal plane obliquely through the outer casing $b$, as shown in Fig. 3, so as to protrude through the rear end of the casing near one of its longitudinal sides; and from this point it extends obliquely downward as shown by dotted lines in Fig. 2, so as to be confined to a single external bend without interfering with its effective operation. The escape of the foul air charged with carbon-dioxid thrown off by the eggs is thus easily regulated with great nicety in the manufacture of the incubator, so as to obviate the adjustment of slides or the like when the incubator is in use.

Said hot-air chamber $e$ is preferably and conveniently heated by means of a lamp, $h$, Fig. 1, located at one side of the incubator externally beneath a vertical open-ended flue, $i$, which is jacketed against the radiation of heat, and is connected with said hot-air chamber by two tubular connections, 11 and 12, at points near the top and near the bottom of the incubator respectively, so as to provide for a circulation of the hot air within the hot-air chamber $e$ and said vertical flue $i$, and in this way to provide for a more equal distribution of heat around the egg chamber. To more fully insure the heating of the front end of the egg chamber $a$ to an ample extent to equalize the cooling effect of the joints around the door $a'$ and the occasional opening of the door, the upper tubular connection 11 is provided with an extension 11' which may be flattened as shown to accommodate an extension of equal area at least in cross section as compared with the connection 11 within the hot-air space above the egg chamber $a$, and thus to insure a free discharge through said connection 11 and extension 11' into the hot-air chamber $e$. An inner flue, $j$, extends upwardly within said vertical flue $i$ from the lamp burner as its chimney, and is curved at its upper end so as to enter the upper tubular connection 11 to a sufficient extent as shown in Fig. 2. In this way the hot products of combustion are ordinarily mixed with the hot air that enters the hot-air chamber $e$ from the interior of the vertical flue $i$, and the heating capacity of the lamp is thus more fully utilized as compared with the arrangement set forth in the specification forming part of said Letters Patent No. 828,181.

The heat is regulated automatically by a thermostat, $k$, within the egg chamber $a$, connected by a vertical rod, 13, with the customary external weighted lever, 14, which is in turn connected at its long end with the center of a damper, 15, that normally closes the upper end of said vertical flue $i$. Should the heat become excessive the expansion of the extensible member of the thermostat $k$ causes the latter to transmit motion through said lever 14 to said damper 15 in such a way as to open the upper end of the flue $i$ more or less, so that the hot air and even the products of combustion may find a direct exit at the upper end of the flue, and thus be kept from entering the hot-air chamber $e$, whereby the temperature within the egg chamber is quickly regulated, which is a matter of great importance.

Normally the upper end of the flue $i$ is closed by the damper 15, and the discharge from the lamp flue $j$ and hot-air spaces is through an uptake, $l$, arranged centrally at the rear end of the hot-air chamber $e$ and communicating therewith immediately above its bottom.

A suitable lamp-support, shown in Fig. 1, consists of a laterally swinging shelf or table, 16, a pivotal rod, 17, extending upward through a pair of screw-eye guides, 18 and 19, attached to the adjacent side of the casing, and a helical spring, 20, and screw nut, 21, surrounding the rod 17 above one of said guides. The tension of such spring should be only enough to hold the lamp $h$ in place and to prevent the accidental displacement of the lamp-support table or shelf 16.

For the purposes of the present invention the lamp support, the thermostat and the appurtenances of the latter may be of any known or improved construction; and other like modifications will suggest themselves to those skilled in the art.

Having thus described said improvement, I claim as my invention, and desire to patent under this specification:

1. The combination, in an incubator, of an egg chamber, means for heating the same, an outer casing inclosing said chamber and provided at bottom with an air inlet in communication with said egg chamber, and means for controlling the free escape of foul air from said chamber, such means consisting of an open ended and unobstructed outlet pipe communicating with the top of the egg chamber and extending thence horizontally through the outer casing and obliquely downward outside the casing.

2. The combination, in an incubator, of an egg chamber having a heat-conducting top of sheet metal, means for heating the same including a hot-air chamber extending horizontally above the egg-chamber top, an outer casing inclosing said hot air chamber and provided at bottom with an air inlet in communication with said egg chamber, and means for controlling the free escape of foul air from said chamber, such means consisting of an open-ended and unobstructed outlet pipe and flattened to accommodate itself to a relatively contracted hot-air space above said egg-chamber top, said outlet pipe communicating with the top of the egg chamber, and extending thence horizontally through the outer casing and outside said casing.

3. The combination, in an incubator, of an egg chamber having a heat-conducting top of sheet metal, means for heating the same including a hot-air chamber extending horizontally above the egg-chamber top, an outer casing inclosing said hot air chamber, an air inlet in the floor of said egg chamber, means for distributing the fresh air entering the chamber, and means for controlling the free escape of foul air from said chamber, such controlling means consisting of an open-ended and unobstructed outlet pipe and flattened to accommodate itself to a relatively contracted hot-air space above said egg-chamber, said outlet pipe communicating with the top of the egg chamber at a central point, and extending thence horizontally through the outer casing and obliquely downward outside the casing.

4. The combination, in an incubator, of an egg chamber having substantially parallel side walls and a substantially horizontal top of heat conducting sheet metal, an inlet door substantially at right angles to said side walls, means for heating the egg chamber including a hot air chamber extending on both sides of the egg chamber immediately outside said walls and said top, a hot air tube connecting the two side portions of said hot air chamber with each other and extending through the front end of the egg chamber immediately inside said inlet door, a vertical open-ended heat flue, tubular connections between said flue and said hot air chamber near the bottom of the latter and near its top respectively, a lamp beneath said flue as means for supplying heat, and an inner flue forming the chimney of the lamp and extending upward within said vertical flue and into the uppermost of said tubular connections.

5. The combination, in an incubator, of an egg chamber having substantially parallel side walls and a substantially horizontal top of heat-conducting sheet metal, means for heating the same including a hot-air chamber extending outside said walls and in contact therewith, an outer casing inclosing said hot-air chamber, a vertical open-ended heat flue outside said casing at one side of said hot-air chamber, tubular connections between said flue and the hot-air chamber near the bottom of the latter and near its top respectively, a lamp beneath said flue as means for supplying heat, an inner flue forming the chimney of the lamp and extending upward within said vertical flue and into the uppermost of said tubular connections, and means for the admission of fresh air to said egg chamber and for the discharge of foul air therefrom.

6. The combination, in an incubator, of an egg chamber having substantially parallel side walls and a substantially horizontal top of heat-conducting sheet metal, an inlet door substantially at right angles to said side walls and a heat-conducting end wall parallel therewith, means for heating the same including a hot-air chamber extending outside said walls and said top and in contact therewith and a horizontal hot-air tube extending through said side walls within the egg chamber immediately inside said inlet door, an outer casing inclosing said hot-air chamber, a vertical open-ended heat flue outside said casing at one side of said hot-air chamber, tubular connections between said flue and the hot air chamber near the bottom of the latter and near its top respectively, an extension of at least equal area in cross section extending inwardly from the uppermost of said connections toward the door end of the incubator, and a lamp beneath said flue as means for supplying heat.

7. The combination, in an incubator, of an egg chamber having substantially parallel side walls and a substantially horizontal top of heat-conducting sheet metal, an inlet door substantially at right angles to said side walls and a heat-conducting end wall parallel therewith, means for heating the same including a hot-air chamber extending outside said walls and said top and in contact therewith and a horizontal hot-air tube extending through said side walls within the egg chamber immediately inside said inlet door, an outer casing inclosing said hot-air chamber, a vertical open-ended heat flue outside said casing at one side of said hot-air chamber, tubular connections between said flue and the hot air chamber near the bottom of the latter and near its top respectively, a lamp beneath said flue as means for supplying heat, and an inner flue forming the chimney of the lamp and extending upward within said vertical flue and into the uppermost of said tubular connections.

8. The combination, in an incubator, of an egg chamber having substantially parallel side walls and a substantially horizontal top of heat-conducting sheet metal, an inlet door substantially at right angles to said side walls and a heat conducting end wall parallel therewith, an outer casing, a lining of the same, a hot air chamber inclosed by said lining extending outside said heat conducting walls and in contact therewith, a horizontal hot air tube extending through said side walls within the egg chamber immediately inside said inlet door, a vertical open-ended heat flue outside said casing at one side of said hot-air chamber, tubular connections between said flue and the hot-air chamber near the bottom of the latter and near its top respectively, an extension of at least equal area in cross section extending inwardly from the uppermost of said connections toward the door end of the incubator, a lamp supported beneath said flue as means for supplying heat, an inner flue forming the chimney of the lamp and extending upward within said vertical flue and into said uppermost tubular connection, a thermostat within the egg chamber, a heat-regulating damper at the upper end of said vertical flue, and means for transmitting motion from said thermostat to said damper, substantially as hereinbefore specified.

GEO. H. BOYD.

Witnesses:
 JAS. L. EWIN,
 A. M. SPOFFORD.